(12) United States Patent
Kirovski et al.

(10) Patent No.: US 7,814,108 B2
(45) Date of Patent: Oct. 12, 2010

(54) SEARCH ENGINE PLATFORM

(75) Inventors: Darko Kirovski, Kirkland, WA (US); Ashwin Swaminathan, Greenbelt, MD (US); Cherian Varkey Mathew, Tiruvalla (IN)

(73) Assignee: Microsoft Corporation, Redmond, WA (US)

( * ) Notice: Subject to any disclaimer, the term of this patent is extended or adjusted under 35 U.S.C. 154(b) by 417 days.

(21) Appl. No.: 12/058,001

(22) Filed: Mar. 28, 2008

(65) Prior Publication Data

US 2009/0164426 A1 Jun. 25, 2009

Related U.S. Application Data

(60) Provisional application No. 61/015,735, filed on Dec. 21, 2007.

(51) Int. Cl.
G06F 17/30 (2006.01)
(52) U.S. Cl. .................................. 707/749; 707/754
(58) Field of Classification Search .............. 707/1–3, 707/100, 101, 103 R, 103 Y, 104.1, 706, 707, 707/711, 713, 714, 720, 722, 723, 727, 729, 707/748, 749, 750, 754
See application file for complete search history.

(56) References Cited

U.S. PATENT DOCUMENTS

| | | | |
|---|---|---|---|
| 5,594,897 A | 1/1997 | Goffman | |
| 6,526,440 B1 | 2/2003 | Bharat | |
| 6,584,456 B1 * | 6/2003 | Dom et al. | 706/45 |
| 6,665,666 B1 | 12/2003 | Brown et al. | |
| 6,738,764 B2 | 5/2004 | Mao et al. | |
| 7,685,198 B2 * | 3/2010 | Xu et al. | 707/748 |
| 7,716,226 B2 * | 5/2010 | Barney | 707/748 |
| 2004/0255237 A1 | 12/2004 | Tong | |
| 2005/0114130 A1 | 5/2005 | Java et al. | |
| 2006/0089926 A1 | 4/2006 | Knepper et al. | |
| 2006/0106793 A1 | 5/2006 | Liang | |
| 2006/0136411 A1 | 6/2006 | Meyerzon et al. | |
| 2006/0161534 A1 | 7/2006 | Carson et al. | |
| 2006/0173817 A1 | 8/2006 | Chowdhury et al. | |

(Continued)

OTHER PUBLICATIONS

Antonio Jose Jimeno Yepes, et al. Towards an Ontology Based Search Mechanism for the Edms At Cern. Proceedings of EPAC 2004, Lucerne, Switzerland http://accelconf.web.cern.ch/AccelConf/e04/PAPERS/WEPLT021.PDF. Last accessed Nov. 22, 2007, 3 pages.

(Continued)

Primary Examiner—Cam-Linh Nguyen
(74) Attorney, Agent, or Firm—Lee & Hayes, PLLC

(57) ABSTRACT

Systems and methods to perform efficient searching for web content using a search engine are provided. In an illustrative implementation, a computing environment comprises a search engine computing application having an essential pages module operative to execute one or more selected selection algorithms to select content from a cooperating data store. In an illustrative operation, the exemplary search engine executes on a received search query to generate search results. Operatively, the retrieved results can be generated based upon their joint coverage of the submitted search query by deploying a selected sequential forward floating selection (SFFS) algorithm executing on the essential pages module. In the illustrative operation, the SFFS algorithm can operate to iteratively add one and delete one element from the set to improve a coverage score until no further improvement can be attained. The resultant processed search results can be considered essential pages.

20 Claims, 10 Drawing Sheets

U.S. PATENT DOCUMENTS

| | | | |
|---|---|---|---|
| 2006/0242129 | A1 | 10/2006 | Libes et al. |
| 2006/0248049 | A1 | 11/2006 | Cao et al. |
| 2006/0271353 | A1 | 11/2006 | Berkan et al. |
| 2007/0073641 | A1 | 3/2007 | Perry et al. |
| 2007/0083506 | A1 | 4/2007 | Liddell et al. |
| 2007/0112755 | A1* | 5/2007 | Thompson et al. ............. 707/5 |
| 2007/0143273 | A1 | 6/2007 | Knaus et al. |
| 2007/0150473 | A1 | 6/2007 | Li et al. |
| 2007/0203908 | A1 | 8/2007 | Wang et al. |
| 2009/0037858 | A1* | 2/2009 | Thakur et al. .................. 716/5 |

OTHER PUBLICATIONS

Gaurav Chandalia, et al. Re-ranking Search Results based on Perturbation of Concept-Association Graphs, Proceedings of the 1st North East Student Colloquium on Artificial Intelligence, Ithaca, NY, USA. http://www.cs.umass.edu/~gsc/papers/queryrerank_nescai.pdf. Last accessed Nov. 22, 2007, 7 pages.

Davide Buscaldi, et al. A Bag-of-Words Based Ranking Method for the Wikipedia Question Answering Task http://www.springerlink.com/content/tn7k38r051664u4v/. Last accessed Nov. 22, 2007, 2 pages.

Djoerd Heimstra, et al. Relevance Feedback for Best Match Term Weighting Algorithms in Information Retrieval http://www.ercim.org/publication/ws-proceedings/DelNoe02/hiemstra.pdf. Last accessed Jan. 18, 2008, 6 pages.

D. Scott McCrickard, et al. Visualizing Search Results using SQWID http://citeseer.ist.psu.edu/cache/papers/cs/18485/http:zSzzSzwww.cc.gatech.eduzSzgradszSzmzSzScott.Mc-CrickardzSzpaperszSzwww6.pdf/mccrickard97visualizing.pdf. Last accessed Jan. 18, 2008, 10 pages.

S. E. Robertson, et al. Simple, Proven Approaches to Text Retrieval, UCAM-CL-TR-356, ISSN 1476-2986, Dec. 1994 version with updates May 1996, May 1997, Feb. 2006. http://www.cl.cam.ac.uk/techreports/UCAM-CL-TR-356.pdf. Last accessed Jan. 18, 2008, 8 pages.

* cited by examiner

700

$$E_Q = \underset{E|E \subset D_Q, \|E\|=n_Q}{\arg\max} C\left[\bigcup_{v_d \in D_Q} d\right].$$

| | ESSENTIAL PAGES SELECTION |
|---|---|
| 1 | $E = \emptyset.$ |
| 2 | while $\|E\| < n_Q$ |
| 3 | $k = \arg\max_{j \in D_Q} C(E \cup j)$ |
| 4 | if $C(E \cup k) > C(E)$ |
| 5 | $E = E \cup k$ |
| 6 | $m = \arg\max_{i \in E} C(E - i)$ |
| 7 | if $C(E - m) > C(E)$ |
| 8 | $E = E - m$ |
| 9 | else continue |
| 10 | else break |

FIG. 8

SEARCH ENGINE PLATFORM

CROSS-REFERENCE TO RELATED APPLICATIONS

This application claims the benefit of priority under 35 U.S.C Section 119 from U.S. Provisional Patent Application Ser. No. 61/015,735 entitled "ESSENTIAL PAGES", filed on Dec. 21, 2007, the entirety of which is herein incorporated by reference.

BACKGROUND

The Internet contains a vast amount of information, distributed over a multitude of computers connected by "The Net", hence providing users with large amounts of information on any topic imaginable. Although large amounts of information are available, however, finding the desired information is not always easy or fast.

Search engines have been developed to address the problem of finding desired information on the Internet. Typically a user who has an idea of the type of information desired, enters a search term or search terms and a search engine returns a list of web pages that contain the term or terms. Alternately, a user may want to browse through data, as for example, when a user is not sure what information is wanted.

Not surprisingly, web-search is one of the premium applications on the Internet, resulting in substantial advertisement revenues. Results to Web-search queries are typically influenced by several metrics: 1) {C}—content relevance derived from documents' anchor text, title and headings, word frequency and proximity, file, directory, and domain names, and other more sophisticated forms of content analysis; 2) {U}—user behavior extrapolated from user's spent time-on-page, time-on-domain, click-through rates, etc.; 3) {P}—popularity in the global link structure with authority, readability, and novelty typically determining the linkage.

With current practices, links to the most "relevant," according to the above criteria, pages are then potentially clustered and delivered to users who in turn browse the results to find the desired information. Although researched in detail along most of the mentioned criteria, search engines still leave a lot to be desired. With current practices there exists an important inefficiency of state-of-the-art search engines: content redundancy. Specifically, in queries where learning about a subject is objective, currently deployed search engines return unsatisfactory results as they consider the query coverage by each page individually, not a set of pages as a whole.

From the foregoing it is appreciated that there exists a need for systems and methods to ameliorate the shortcomings of existing practices.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The subject matter described herein allows for systems and methods to perform efficient searching for web content using a search engine. In an illustrative implementation, a computing environment comprises a search engine computing application having an essential pages module operative to execute one or more selected selection algorithms to select content from a cooperating data store.

In an illustrative operation, the exemplary search engine executes on a received search query to generate search results. Operatively, the retrieved results can be generated based upon their joint coverage of the submitted search query by deploying a selected sequential forward floating selection (SFFS) algorithm illustratively executing on the essential pages module. In the illustrative operation, the SFFS algorithm can operate to iteratively add one and delete one element from the set to improve a coverage score until no further improvement can be attained. The resultant processed search results can be considered essential pages.

In an illustrative operation, the resultant essential pages can be electronically delivered responsive to the received search query by the essential pages module to one or more cooperating computing environments.

The following description and the annexed drawings set forth in detail certain illustrative aspects of the subject matter. These aspects are indicative, however, of but a few of the various ways in which the subject matter can be employed and the claimed subject matter is intended to include all such aspects and their equivalents.

BRIEF DESCRIPTION OF THE DRAWINGS

FIG. 7 is a block diagram of an exemplary equation for use in determining essential pages.

FIG. 8 is a flow diagram of exemplary pseudo-code for an exemplary illustrative sequential forward floating algorithm used in identifying essential pages.

DETAILED DESCRIPTION

Figure 1:
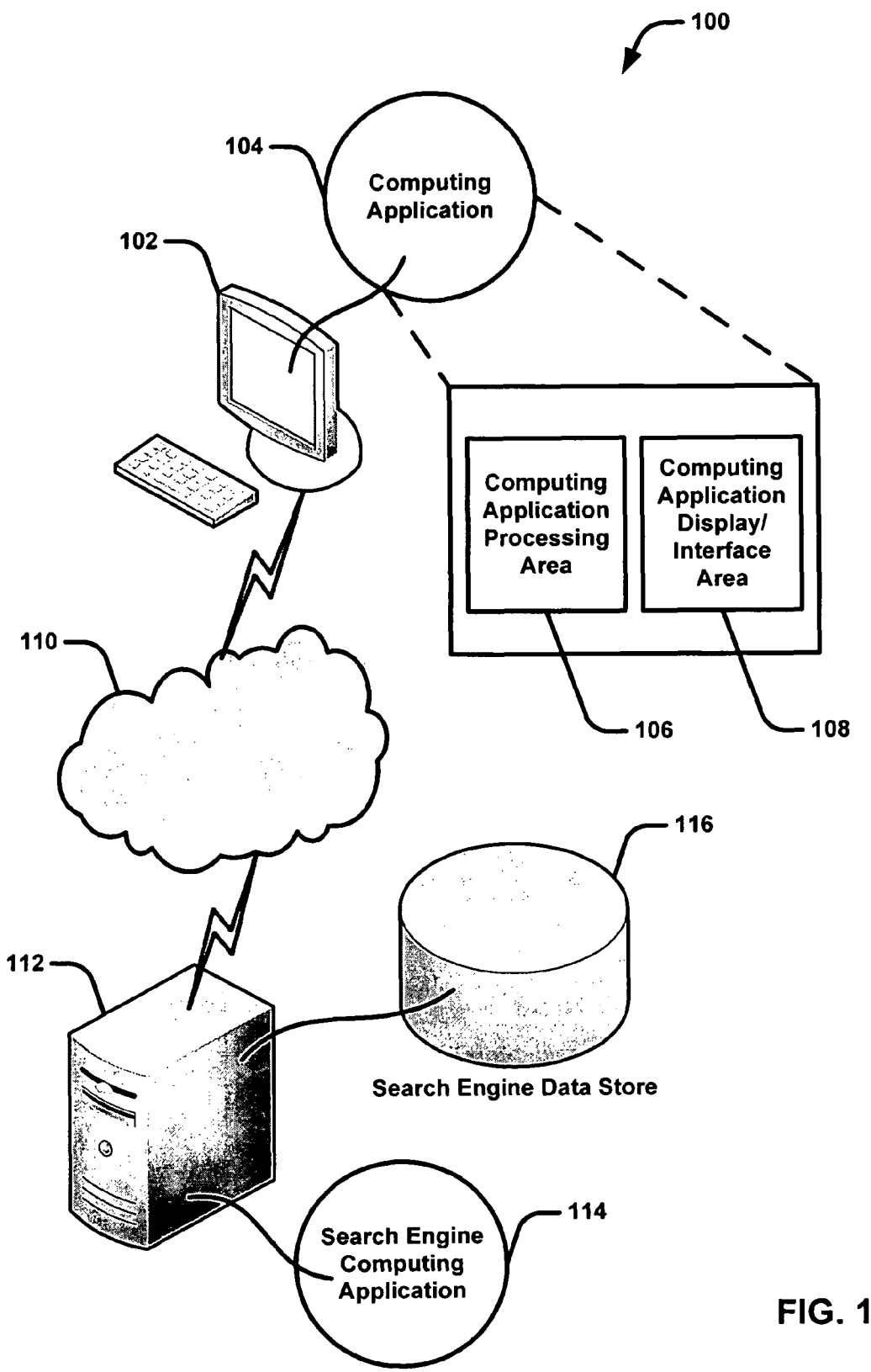
FIG. 1 is a block diagram of an exemplary computing environment executing a search engine.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, the terms "system," "component," "module," "interface," "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Although the subject matter described herein may be described in the context of illustrative illustrations to process one or more computing application features/operations for a computing application having user-interactive components the subject matter is not limited to these particular embodiments. Rather, the techniques described herein can be applied to any suitable type of user-interactive component execution management methods, systems, platforms, and/or apparatus.

Search Engine Processing Overview:

Existing practices include a method to rank documents using an optimization framework to maximize the probability of finding a relevant document in a top set n. In addition to relevance, existing practices also consider diversity of Web-search results as an additional factor for ordering documents. A re-ranking technique based on maximum marginal relevance criterion to reduce redundancy from search results as well as presented document summarizations has been considered. Additionally, an affinity ranking scheme to re-rank search results by optimizing diversity and information richness of the topic and query results has been developed. Such practices model the variance of topics in groups of documents.

The herein described systems and methods provide a modeling of the overall knowledge space for a specific query and improving the coverage of this space by a set of documents. In an illustrative implementation a "bag-of-words" model for representing knowledge spaces is provided. Additionally, in the illustrative implementation, a formal notion of coverage over the "bag-of-words" is provided and a simple but systematic algorithm to select documents that maximize coverage is derived to allow relevance to the search topic.

Essential Pages:

FIG. 1 describes computing environment 100 operative to perform one or more web searches using an exemplary search engine. As is shown in FIG. 1, computing environment 100 comprises client computing environment 102, communications network 110, and server computing environment 112. Further, as is shown in FIG. 1, client computing environment 102 further comprises computing application 104 which illustratively includes computing application processing area 106 and computing application display/interface area 108. Further, as is shown in FIG. 1, server computing environment comprises search engine computing application 114 and cooperates with search engine data store 116.

In an illustrative operation, a search request (e.g., providing a search query) can be communicated from client computing environment 102 (e.g., by receiving one or more inputs from a participating user (not shown) using computing application 104 computing application display area 108) over communications network 110 to server computing environment 112. Responsive to the search request, server computing environment 112 executing search engine computing application 114 can process the search request and generate search results using data from search engine data store 116 according to one or more selected search heuristics. The generated search results can then be communication from server computing environment 112 to client computing environment 102 over communications network 110 for processing and display by computing application 104 (e.g., a web browser computing application) utilizing computing application processing area 106 and computing application display/interface area 108.

Figure 2:
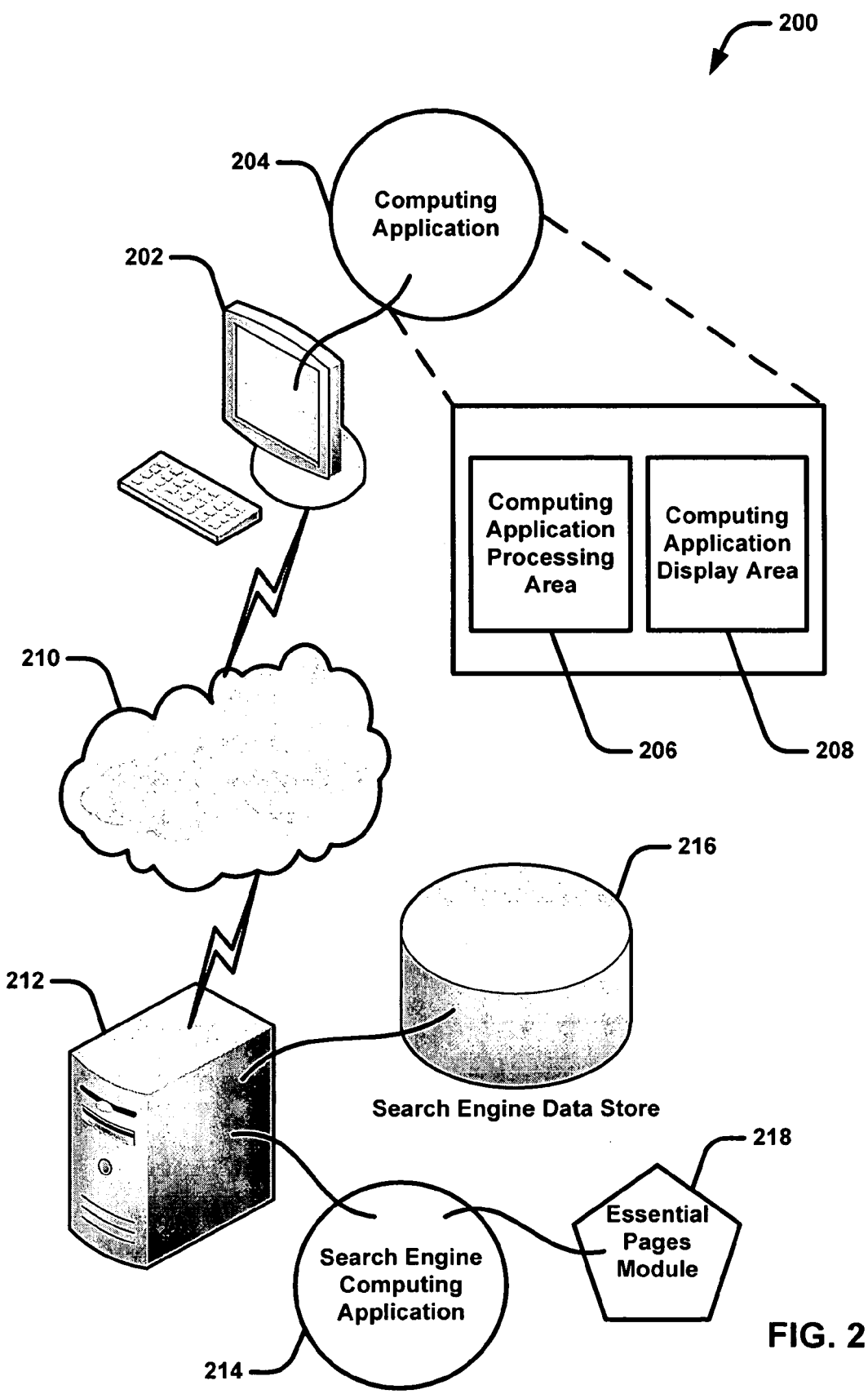
FIG. 2 is a block diagram of an exemplary computing environment executing a search engine operative to identify essential pages.

FIG. 2 describes computing environment 200 operative to perform one or more web searches using an exemplary search engine. As is shown in FIG. 2, computing environment 200 comprises client computing environment 202, communications network 210, and server computing environment 212. Further, as is shown in FIG. 2, client computing environment 202 further comprises computing application 204 which illustratively includes computing application processing area 206 and computing application display/interface area 208. Further, as is shown in FIG. 2, server computing environment comprises search engine computing application 214 having essential pages module 218 and cooperates with search engine data store 216.

In an illustrative operation, a search request (e.g., providing a search query) can be communicated from client computing environment 202 (e.g., by receiving one or more inputs from a participating user (not shown) using computing application 204 computing application display area 208) over communications network 210 to server computing environment 212. Responsive to the search request, server computing environment 212 executing search engine computing application 214 can process the search request and generate search results using data from search engine data store 216 according to one or more selected search heuristics provided by essential pages module 218. The generated search results can then be communication from server computing environment 212 to client computing environment 202 over communications network 210 for processing and display by computing application 204 (e.g., a web browser computing application) utilizing computing application processing area 206 and computing application display/interface area 208.

It is appreciated that although, essential pages module 218 is depicted to operatively run on server computing environment 212 that such depiction is merely illustrative as the herein described systems and methods can be illustratively deployed such that the essential pages module is operative on, in whole or in part, on client computing environment 202.

Figure 3:
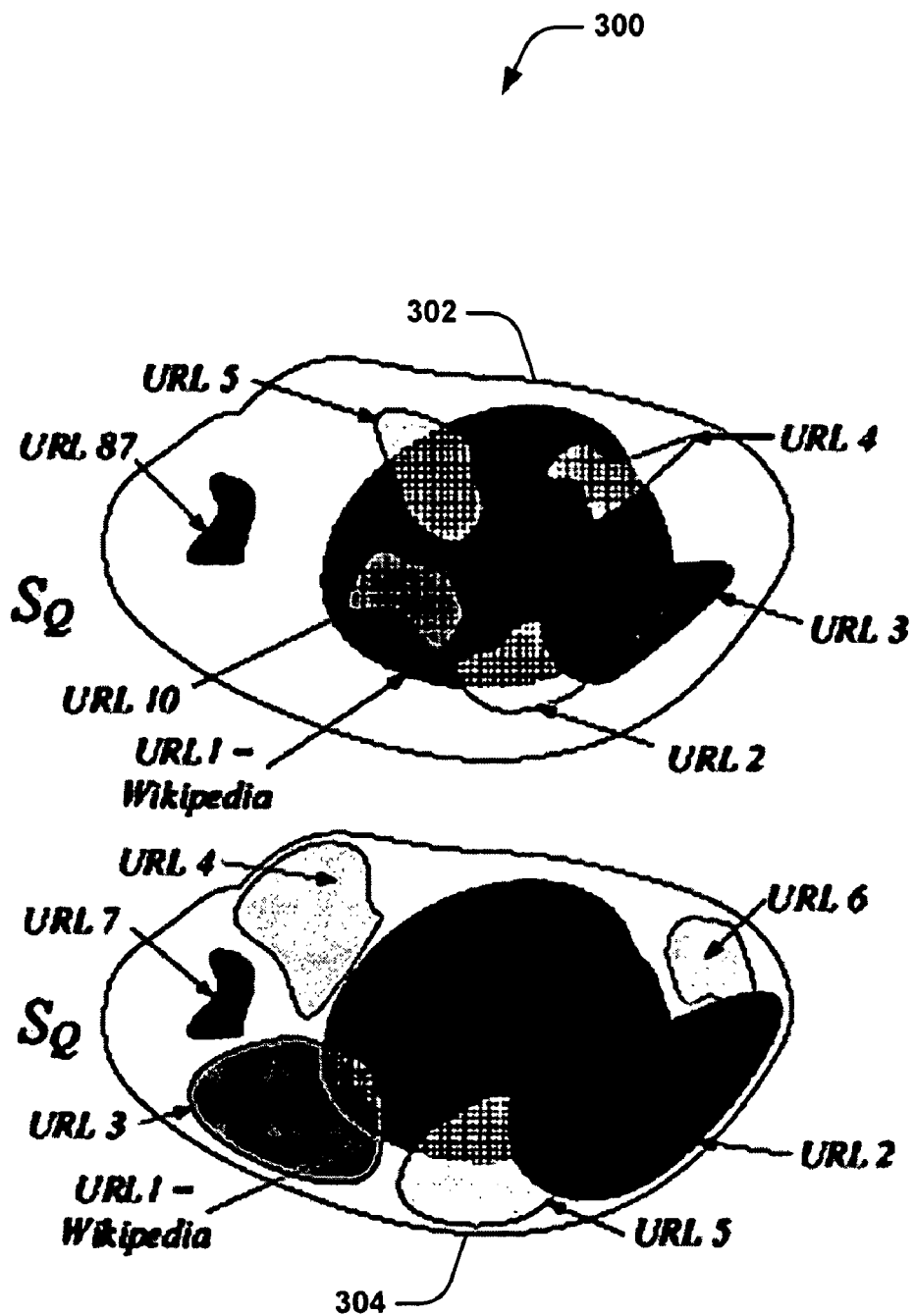
FIG. 3 is a block diagram describing query coverage by a currently deployed search engine and a search engine using an essential pages search heuristic.

FIG. 3 schematically illustrates an illustrative implementation of how $S_Q$ (i.e., the total knowledge that exists on the Web about a given query Q) is covered by a set of pages computed using a traditional page ranking algorithm as described by graph 302 and a set of essential pages assembled to maximize their joint query coverage as described by graph 304. As shown by graph 302, in the traditional model, in order to learn details about $S_Q$, users have to browse substantially more pages (e.g., as denoted by the size of $S_Q$). In the illustrative implementation, a traditional search engine can be used to obtain a list of relevant URLs for a given query and then subsequently processed according to a selected essential pages re-ordering algorithm as part of an illustrative post processing exemplary method as described by graph 304.

Figure 4:
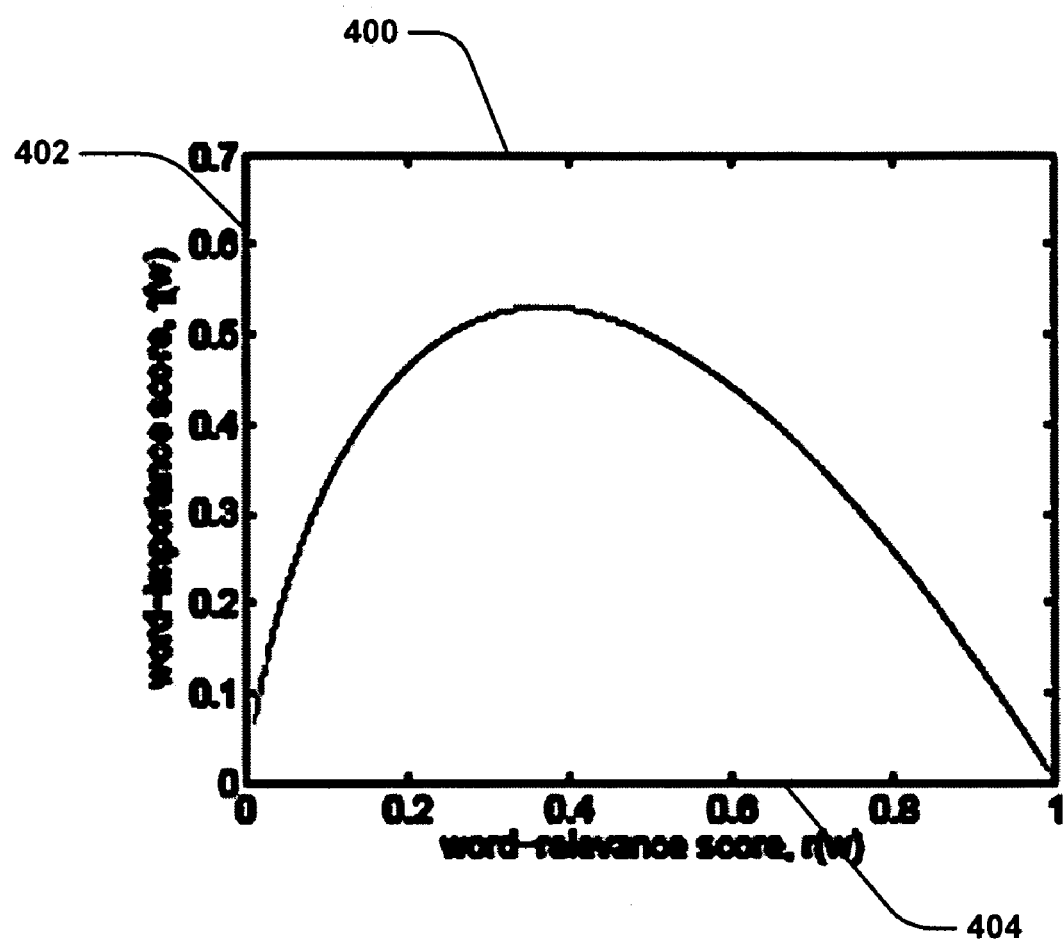
FIG. 4 is a graph describing the relationship of a word-importance score as a function of the word-relevance score.

FIG. 4 graphically illustrates, via graph 400, the relationship of word-importance score 402 as function of a word-relevance score 404. In an illustrative implementation, a search engine is provides that illustratively operates to find a set of pages that gives maximum coverage about a particular search query Q over an exemplary related knowledge space $S_Q$. In the illustrative implementation, a relevance based rand ordered search engine deploying a "bag-of-words" approach is provided to execute on the essential pages search heuristic. With a "bag-of-words" approach, a document is processed as a collection of statistics over a set (i.e., bag, of words used in it, without explicit semantic constructions such as sentences, formatting, etc.). In an illustrative operation, a web-page can be considered as a bag-of-words where each distinct word is associated with the total number of times the word appears in a specific document.

Figure 5:
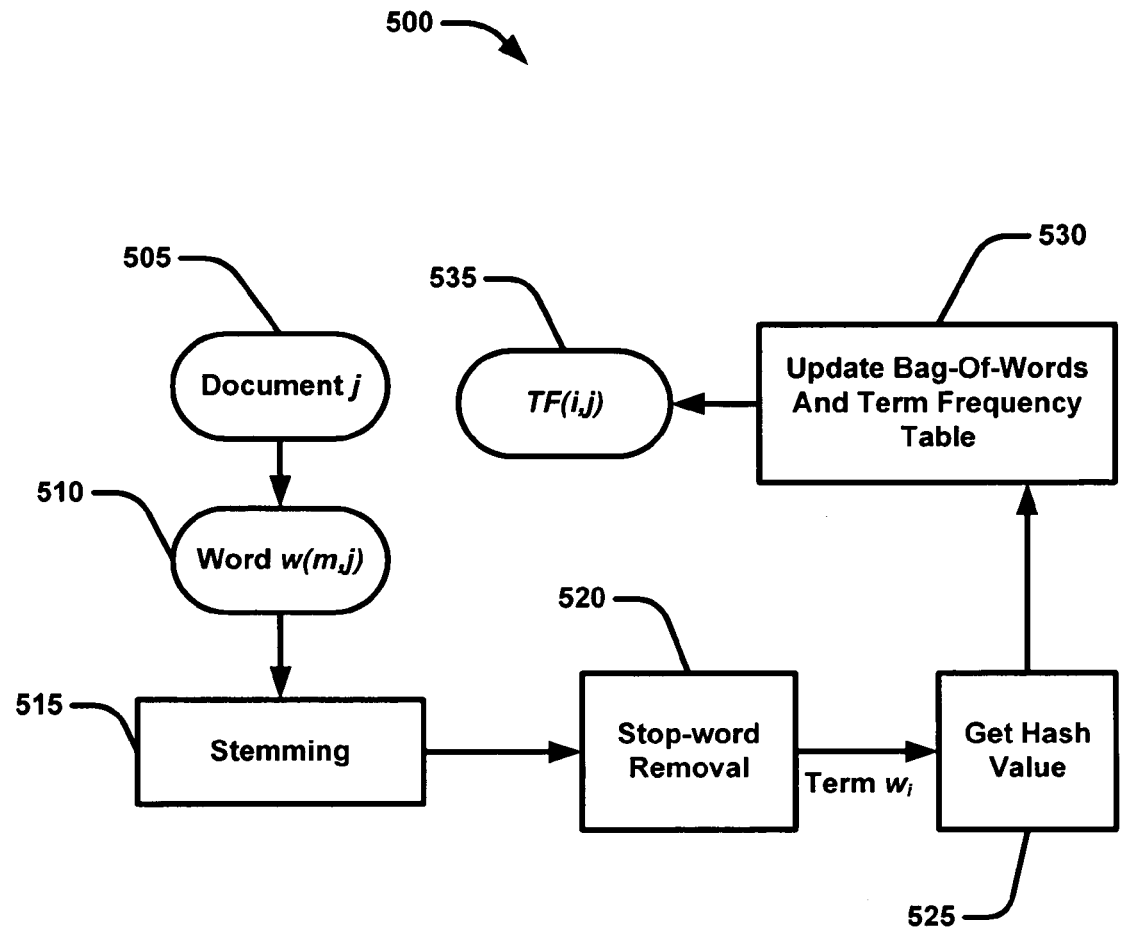
FIG. 5 is an exemplary flow diagram showing illustrative processing performed when document indexing.

FIG. 5 describes an illustrative method 500 for performing document indexing for essential pages. As is shown, processing begins at block 505 where for each document j in an exemplary database D the words in the document are first extracted. From there, processing proceeds to block 510 where the exemplary database of documents is classified so that the m-th word in the j-th document can be described. Processing then proceeds to block 515 were word stemming is performed. In an illustrative operation, the word root is retained while word endings are removed. Illustratively, words such as "as," "is," "be," etc., in a pre-defined set of stop-words can be then removed as they do not describe the context semantics. Illustratively, stemming and stopping as performed at block 520 can improve search performance by giving users more pertinent results; they also reduce the search complexity by reducing the dictionary of words. Illustratively, the total number of unique terms in the resulting list T as Nt can be denoted. Term frequency T F (i, j) can indicate the number of times i-th term appears in j-th document. The term frequency information for D and T can be illustratively organized as a term frequency table of size Nt×Nd. To facilitate fast access, a hash table can be constructed at block 525 to map each term to the corresponding row of the term frequency table as performed at block 535. Additionally, as is shown in FIG. 5, updates to the bag-of-words and term frequency table can be performed at block 530.

Figure 6:
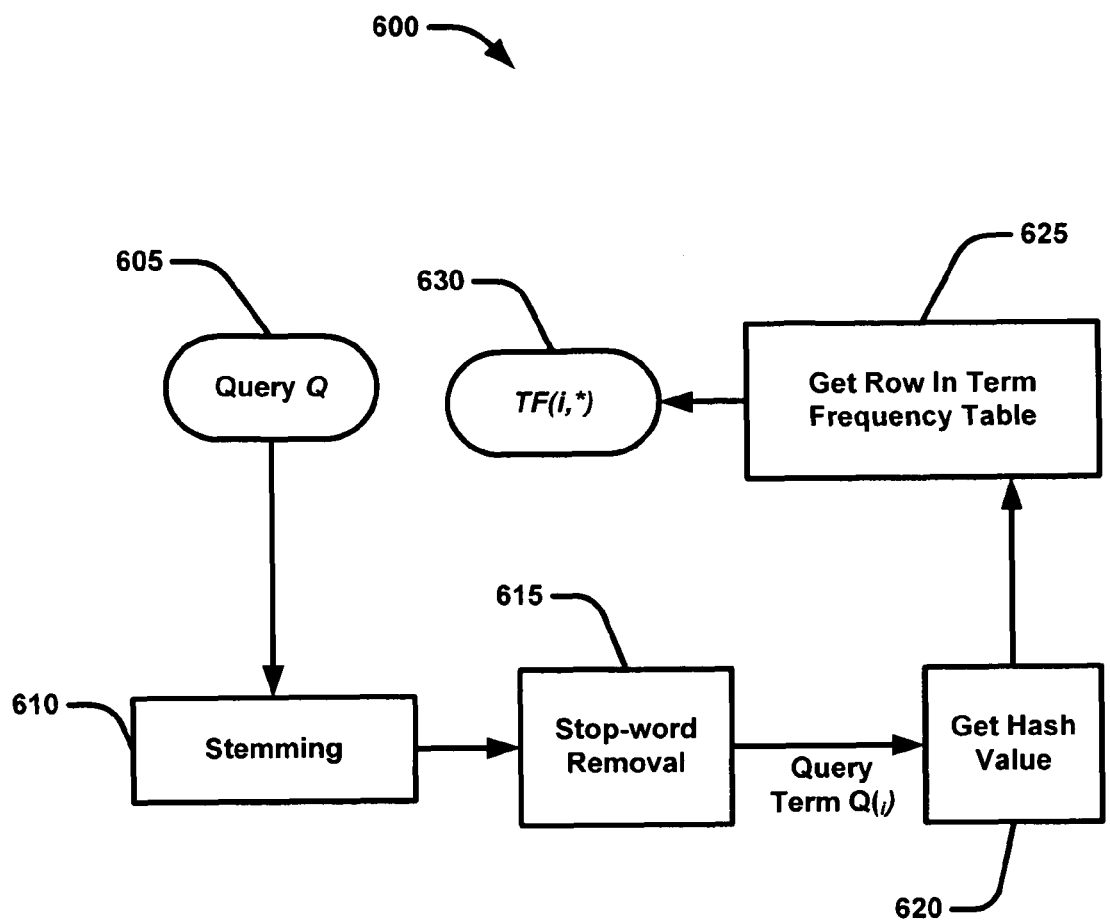
FIG. 6 is an exemplary flow diagram showing illustrative processing when calculating an exemplary global term frequency table.

FIG. 6 describes illustrative method 600 for computing and storing an exemplary global term-frequency table. As is shown, processing begins at block 605 where a query is received. Processing then proceeds to block 610 where a query word Q first undergoes stemming and then stopping at block 615. From there processing proceeds to block 620 where the hash value of the query word can be used to point at block 625 to the corresponding row of the term frequency table as described in block 630.

In context to the processing described in FIGS. 5 and 6, given a single-term query Q, the subset of documents, DQ, containing Q is identified using the global term-frequency table. As DQ contains all the information about Q, the set of terms (bag-of-words) extracted from DQ as SQ can illustratively denoted. Essential page selection can be described a subset of documents EQ ½ DQ that provides maximum coverage about the query. In an illustrative implementation, $N_d^Q = \|D_Q\|$ and $N_t^Q = |S_Q|$ are set. In the illustrative implementation, the documents in DQ contain the query term. For queries containing multiple terms, {Q(1), ..., W(m)} at least one of these terms appears in each document in DQ. The subset of the global term-frequency table that relates to the search query Q as $TF^Q = S_Q \times D_Q$ can be illustratively denoted and its size $N_t^Q \times N_d^Q$ can be recorded. For each word, $w \in S_Q$, relevant to the query, a query-relevance score can be defined r(w) can be expressed:

$$r(w) = \frac{n_w^Q}{N_d^Q},$$

where $n_w^Q$ represents the number of documents in DQ which contain w. The query-relevance score measures how relevant w is to Q; the higher the score, the higher the relevance.

In the illustrative implementation, a coverage score can be defined as C(j) of a document $j \in D_Q$ to be:

$$C(j) = \sum_{\forall w_i \in S_Q} \gamma(w_i) \times TF^Q(i, j).$$

where $TF^Q(i, j)$ represents the term-frequency value of the i-th word, $\omega_i$ in document j. The term $\gamma(\omega_i)$ can be used to quantify the overall importance given to covering $\omega_i$ in $E_Q$ which can be considered the word-importance score, which can be defined as:

$$\gamma(w_i) = r(w_i) \log_2 \left[ \frac{1}{r(w_i)} \right].$$

FIG. 4 shows the variation of $\gamma(\omega_i)$ vs. $r(\omega_i)$. As is shown in FIG. 4 the word importance metric can be described by the following illustrative descriptions: 1) Low r(wi)—words that are less relevant to the query can be considered to not provide significant information about the query, and can be considered less important; 2) High r(wi)—words that are very relevant to the query (such as the query words itself) can be considered to provide more information about the query; 3) Important words—for words that lie in between the above two cases, word-importance can be considered relatively high and our algorithms aim at covering these words with as few as possible pages from DQ. In the illustrative implementation, generalizing on the word-importance score equation, a joint coverage score of set of documents can be defined by the equation:

$$C(a \cup b) = \sum_{\forall w_i \in S_Q^a \cup S_Q^b} \gamma(w_i) \cdot T(i),$$

$$T(i) = \max\{TF^Q(i, a), TF^Q(i, b)\}.$$

Where two documents a and b having corresponding bag-of-words $S_Q^a$ and $S_Q^b$.

FIG. 7 describes the essential pages equation 700 which illustratively operates to maximize the joint coverage score (as described by FIG. 4). As is shown in FIG. 7, the essential pages equation can be described by:

$$E_Q = \underset{E|E \subset D_Q, \|E\|=n_Q}{\operatorname{argmax}} C\left[\bigcup_{\forall d \in D_Q} d\right].$$

FIG. 8 illustratively presents pseudo-code 800 for the execution of an exemplary SFFS algorithm in identifying essential pages. As is shown in FIG. 8, E=0 is set at step 1. Iteratively, one element is added and deleted from the set to improve coverage. In the adding step shown in step 3, a document $k \subset D_Q$ which when added to set E can result in maximum coverage. Document k is then added to E in step 5 if the condition $C(E \cup k) > C(E)$ is met. In the deletion step 6, a document m which adds the least amount of information to the knowledge space covered by E, can be removed from E in step 8 conditional on $C(E-m) > C(E)$. This iterative process, as is described in FIG. 6, can be repeated until no further improvement can be attained or $\|E\| = n_Q$.

The methods can be implemented by computer-executable instructions stored on one or more computer-readable media or conveyed by a signal of any suitable type. The methods can be implemented at least in part manually. The steps of the methods can be implemented by software or combinations of software and hardware and in any of the ways described above. The computer-executable instructions can be the same process executing on a single or a plurality of microprocessors or multiple processes executing on a single or a plurality of microprocessors. The methods can be repeated any number of times as needed and the steps of the methods can be performed in any suitable order.

The subject matter described herein can operate in the general context of computer-executable instructions, such as program modules, executed by one or more components. Generally, program modules include routines, programs, objects, data structures, etc., that perform particular tasks or implement particular abstract data types. Typically, the functionality of the program modules can be combined or distributed as desired. Although the description above relates generally to computer-executable instructions of a computer program that runs on a computer and/or computers, the user interfaces, methods and systems also can be implemented in combination with other program modules. Generally, program modules include routines, programs, components, data structures, etc. that perform particular tasks and/or implement particular abstract data types.

Moreover, the subject matter described herein can be practiced with most any suitable computer system configurations, including single-processor or multiprocessor computer systems, mini-computing devices, mainframe computers, personal computers, stand-alone computers, hand-held computing devices, wearable computing devices, microprocessor-based or programmable consumer electronics, and the like as well as distributed computing environments in which tasks are performed by remote processing devices that are linked through a communications network. In a distributed computing environment, program modules can be located in both local and remote memory storage devices. The methods and systems described herein can be embodied on a computer-readable medium having computer-executable instructions as well as signals (e.g., electronic signals) manufactured to transmit such information, for instance, on a network.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing some of the claims.

It is, of course, not possible to describe every conceivable combination of components or methodologies that fall within the claimed subject matter, and many further combinations and permutations of the subject matter are possible. While a particular feature may have been disclosed with respect to only one of several implementations, such feature can be combined with one or more other features of the other implementations of the subject matter as may be desired and advantageous for any given or particular application.

Moreover, it is to be appreciated that various aspects as described herein can be implemented on portable computing devices (e.g., field medical device), and other aspects can be implemented across distributed computing platforms (e.g., remote medicine, or research applications). Likewise, various aspects as described herein can be implemented as a set of services (e.g., modeling, predicting, analytics, etc.).

Figure 9:
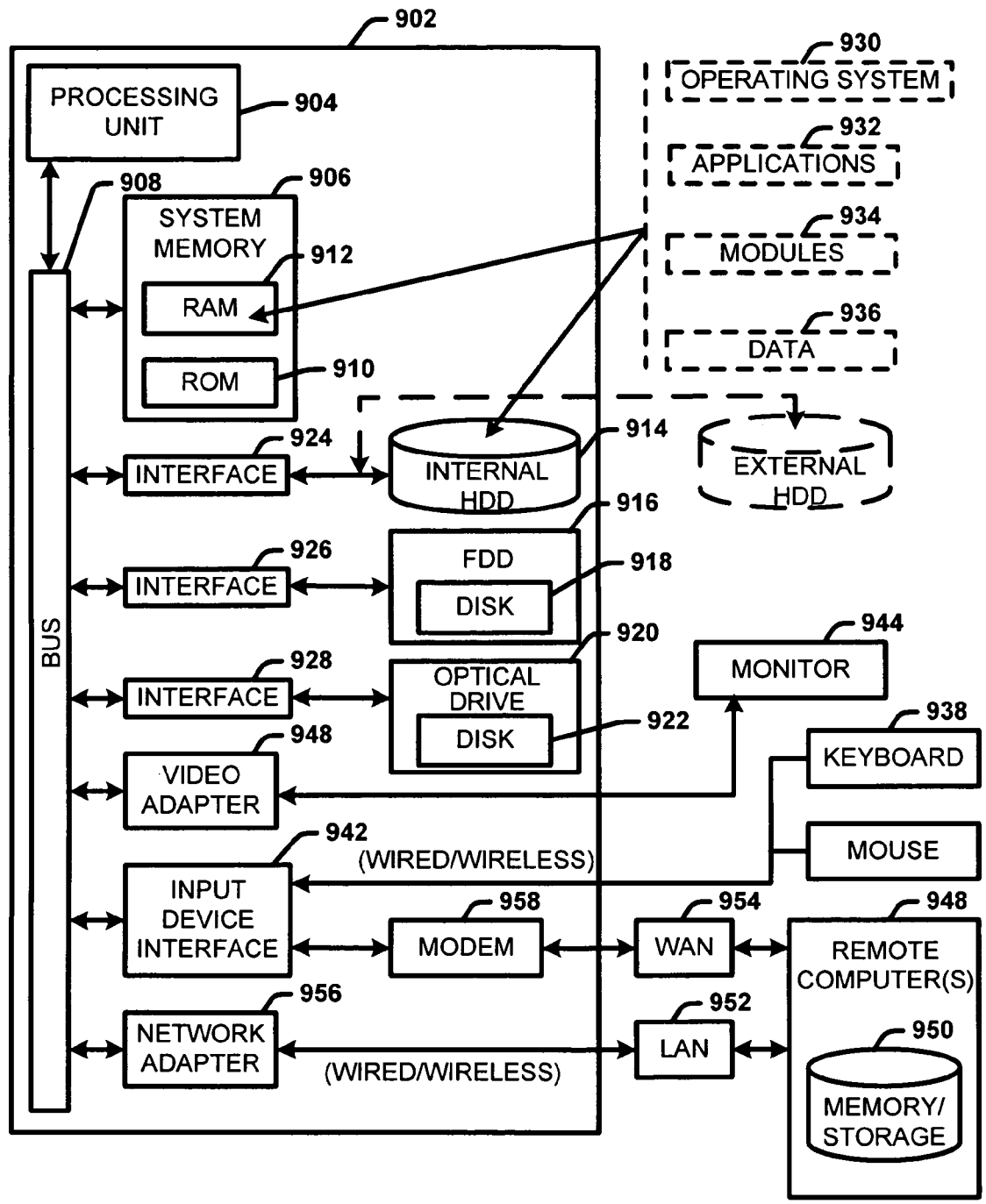
FIG. 9 is an example computing environment in accordance with various aspects described herein.

FIG. 9 illustrates a block diagram of a computer operable to execute the disclosed architecture. In order to provide additional context for various aspects of the subject specification, FIG. 9 and the following discussion are intended to provide a brief, general description of a suitable computing environment 900 in which the various aspects of the specification can be implemented. While the specification has been described above in the general context of computer-executable instructions that may run on one or more computers, those skilled in the art will recognize that the specification also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the specification may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

More particularly, and referring to FIG. 9, an example environment 900 for implementing various aspects as described in the specification includes a computer 902, the computer 902 including a processing unit 904, a system memory 906 and a system bus 908. The system bus 908 couples system components including, but not limited to, the system memory 906 to the processing unit 904. The processing unit 904 can be any of various commercially available processors. Dual microprocessors and other multi-processor architectures may also be employed as the processing unit 904.

The system bus 908 can be any of several types of bus structure that may further interconnect to a memory bus (with or without a memory controller), a peripheral bus, and a local bus using any of a variety of commercially available bus architectures. The system memory 906 includes read-only memory (ROM) 910 and random access memory (RAM) 912. A basic input/output system (BIOS) is stored in a non-volatile memory 910 such as ROM, EPROM, EEPROM, which BIOS contains the basic routines that help to transfer information between elements within the computer 902, such as during start-up. The RAM 912 can also include a high-speed RAM such as static RAM for caching data.

The computer 902 further includes an internal hard disk drive (HDD) 914 (e.g., EIDE, SATA), which internal hard disk drive 914 may also be configured for external use in a suitable chassis (not shown), a magnetic floppy disk drive (FDD) 916, (e.g., to read from or write to a removable diskette 918) and an optical disk drive 920, (e.g., reading a CD-ROM disk 922 or, to read from or write to other high capacity optical media such as the DVD). The hard disk drive 914, magnetic disk drive 916 and optical disk drive 920 can be connected to the system bus 908 by a hard disk drive interface 924, a magnetic disk drive interface 926 and an optical drive interface 928, respectively. The interface 924 for external drive implementations includes at least one or both of Universal Serial Bus (USB) and IEEE 1394 interface technologies. Other external drive connection technologies are within contemplation of the subject specification.

The drives and their associated computer-readable media provide nonvolatile storage of data, data structures, computer-executable instructions, and so forth. For the computer 902, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the example operating environment, and further, that any such media may contain computer-executable instructions for performing the methods of the specification.

A number of program modules can be stored in the drives and RAM 912, including an operating system 930, one or more application programs 932, other program modules 934 and program data 936. All or portions of the operating system, applications, modules, and/or data can also be cached in the RAM 912. It is appreciated that the specification can be implemented with various commercially available operating systems or combinations of operating systems.

A user can enter commands and information into the computer 902 through one or more wired/wireless input devices, e.g., a keyboard 938 and a pointing device, such as a mouse 940. Other input devices (not shown) may include a microphone, an IR remote control, a joystick, a game pad, a stylus pen, touch screen, or the like. These and other input devices are often connected to the processing unit 904 through an input device interface 942 that is coupled to the system bus 908, but can be connected by other interfaces, such as a parallel port, an IEEE 1394 serial port, a game port, a USB port, an IR interface, etc.

A monitor 944 or other type of display device is also connected to the system bus 908 via an interface, such as a video adapter 946. In addition to the monitor 944, a computer typically includes other peripheral output devices (not shown), such as speakers, printers, etc.

The computer 902 may operate in a networked environment using logical connections via wired and/or wireless communications to one or more remote computers, such as a remote computer(s) 948. The remote computer(s) 948 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 950 is illustrated. The logical connections depicted include wired/wireless connectivity to a local area network (LAN) 952 and/or larger networks, e.g., a wide area network (WAN) 954. Such LAN and WAN networking environments are commonplace in offices and companies, and facilitate enterprise-wide computer networks, such as intranets, all of which may connect to a global communications network, e.g., the Internet.

When used in a LAN networking environment, the computer 902 is connected to the local network 952 through a wired and/or wireless communication network interface or adapter 956. The adapter 956 may facilitate wired or wireless communication to the LAN 952, which may also include a wireless access point disposed thereon for communicating with the wireless adapter 956.

When used in a WAN networking environment, the computer 902 can include a modem 958, or is connected to a communications server on the WAN 954, or has other means for establishing communications over the WAN 954, such as by way of the Internet. The modem 958, which can be internal or external and a wired or wireless device, is connected to the system bus 908 via the serial port interface 942. In a networked environment, program modules depicted relative to the computer 902, or portions thereof, can be stored in the remote memory/storage device 950. It will be appreciated that the network connections shown are example and other means of establishing a communications link between the computers can be used.

The computer 902 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11(a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 10:
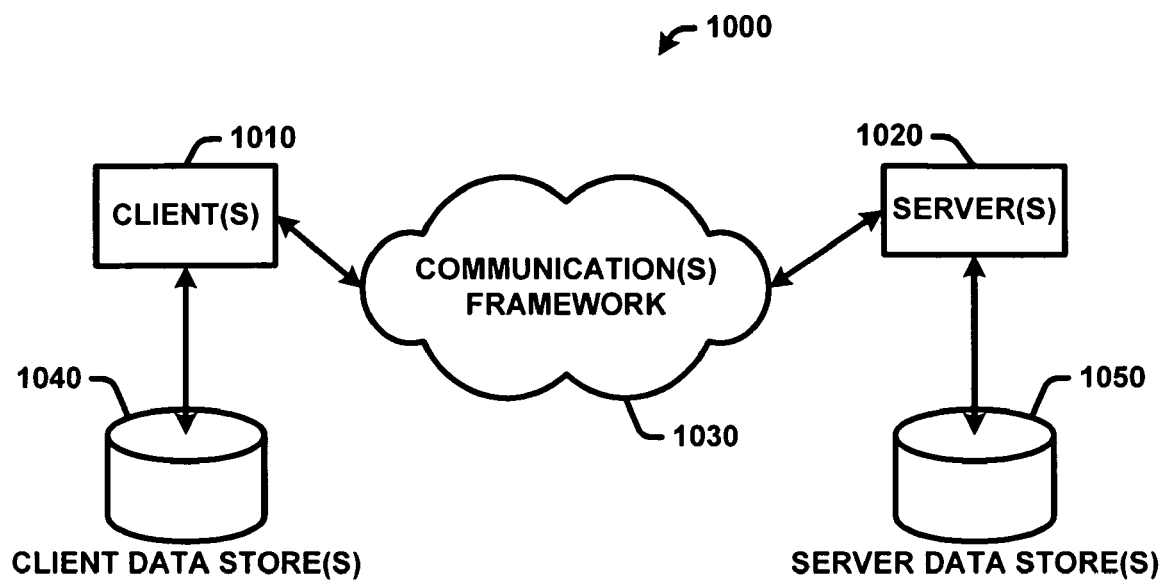
FIG. 10 is an example networked computing environment in accordance with various aspects described herein.

Referring now to FIG. 10, there is illustrated a schematic block diagram of an exemplary computing environment 1000 in accordance with the subject invention. The system 1000 includes one or more client(s) 1010. The client(s) 1010 can be hardware and/or software (e.g., threads, processes, computing devices). The client(s) 1010 can house cookie(s) and/or associated contextual information by employing the subject invention, for example. The system 1000 also includes one or more server(s) 1020. The server(s) 1020 can also be hardware and/or software (e.g., threads, processes, computing devices). The servers 1020 can house threads to perform transformations by employing the subject methods and/or systems for example. One possible communication between a client 1010 and a server 1020 can be in the form of a data packet adapted to be transmitted between two or more computer processes. The data packet may include a cookie and/or associated contextual information, for example. The system 1000 includes a communication framework 1030 (e.g., a global communication network such as the Internet) that can be employed to facilitate communications between the client(s) 1010 and the server(s) 1020.

Communications can be facilitated via a wired (including optical fiber) and/or wireless technology. The client(s) 1010 are operatively connected to one or more client data store(s) 1040 that can be employed to store information local to the client(s) 1010 (e.g., cookie(s) and/or associated contextual information). Similarly, the server(s) 1020 are operatively connected to one or more server data store(s) 1050 that can be employed to store information local to the servers 1020.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system to facilitate web searching, comprising:
    an essential pages module operative on a search engine computing application; and
    an instruction set comprising at least one instruction to instruct the essential pages module to process search results obtained using an exemplary relevance-based rank-ordered search engine according to a bag-of-words search heuristic according to a selected essential pages search paradigm,
    wherein the essential pages search paradigm is operative to maximize the joint coverage score for a set of pages pertaining to a search query Q as processed by the search engine computing application.

2. The system as recited in claim 1, further comprising a data store operative to store data representative of one or more search queries and one or more search query results.

3. The system as recited in claim 1, wherein one or more portions of the essential pages module executes in a computing environment.

4. The system as recited in claim 1, wherein the essential pages module cooperates with the search engine computing application to execute the at least one instruction to process search results.

5. The system a recited in claim 4, wherein the search results are generated by the search engine computing application.

6. The system as recited in claim 1, wherein the essential pages module is operative to receive one or more search queries from one or more cooperating computing environments.

7. The system as recited in claim 6, wherein the essential pages module is operative to process the one or more search results in cooperation with the search engine computing application to generate one or more search results according to the essential pages paradigm.

8. The system as recited in claim 7, wherein the essential pages module is operative to provide the one or more search results comprising one or more essential pages to the one or more cooperating computing environments.

9. The system as recited in claim 1, wherein the search engine computing application comprises a relevance-based rank-ordered search engine.

10. The system as recited in claim 1, wherein the essential pages module cooperates with a data store to execute one or more instructions representative of the essential pages paradigm.

11. A method for facilitating web searching comprising:
    processing a query Q by an exemplary search engine to generate a resultant set according to a selection algorithm to generate a resultant set, the selection algorithm comprising the steps of,
    iteratively adding one element from the resultant set to improve coverage;
    iteratively deleting one element from the resultant set to improve coverage; and
    processing the resultant set until a selected joint coverage score for the resultant set is achieved.

12. The method as recited in claim 11, further comprising receiving the query Q from one or more cooperating computing environments.

13. The method as recited in claim 11, further comprising calculating the selected joint coverage score according to a coverage score selection algorithm.

14. The method as recited in claim 13, further comprising processing the resultant set until the highest joint coverage score for the resultant set is achieved.

15. The method as recited in claim 11, further comprising identifying the data in the processed resultant set having the selected joint coverage score as essential pages.

16. The method as recited in claim 15, further comprising providing the essential pages responsive to the search query Q.

17. The method as recited in claim 16, further comprising communicating the essential pages over a cooperating communications network to one or more cooperating computing environments.

18. The method as recited in claim 11, further comprising retrieving data from a cooperating data store.

19. The method as recited in claim 18, further comprising processing data from the cooperating data store to generate the resultant set.

20. A computer-readable medium having computer executable instructions to instruct a computing environment to perform a method comprising:

processing a query Q by an exemplary search engine to generate a resultant set according to a selection algorithm to generate a resultant set, the selection algorithm comprising the steps of,
  iteratively adding one element from the resultant set to improve coverage,
  iteratively deleting one element from the resultant set to improve coverage,
  processing the resultant set until the highest joint coverage score for the resultant set is achieved.

* * * * *